A. F. JENKINS.
AUTOMATIC METAL FLEDING DEVICE FOR TORCHES.
APPLICATION FILED MAY 8, 1918. RENEWED FEB. 18, 1922.
1,412,655.
Patented Apr. 11, 1922.
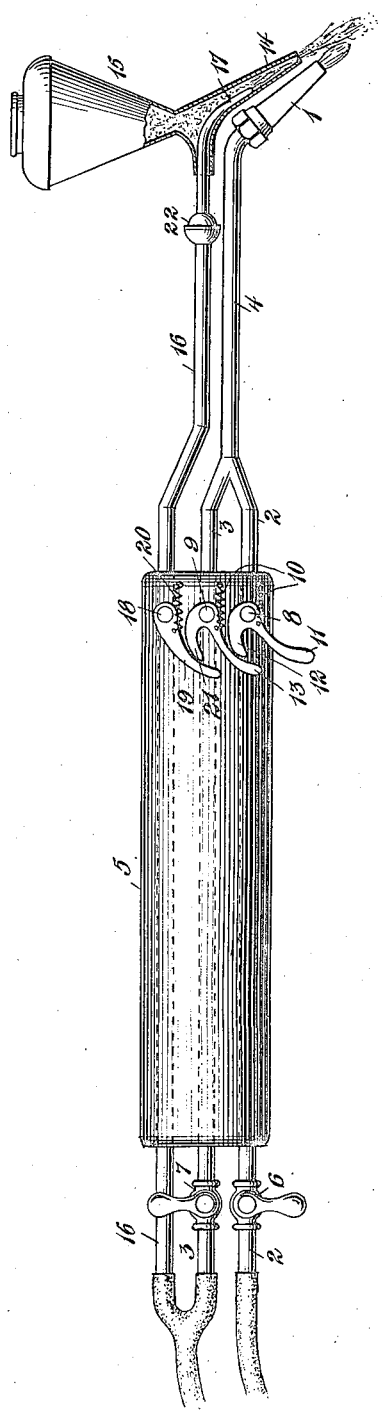
INVENTOR
A. F. Jenkins
BY
C. Bradway.
ATTORNEY

UNITED STATES PATENT OFFICE.

ALEXANDER FREDERICK JENKINS, OF BALTIMORE, MARYLAND.

AUTOMATIC METAL-FEEDING DEVICE FOR TORCHES.

1,412,655.  Specification of Letters Patent.  Patented Apr. 11, 1922.

Application filed May 8, 1918, Serial No. 233,306. Renewed February 16, 1922. Serial No. 537,646.

*To all whom it may concern:*

Be it known that I, ALEXANDER F. JENKINS, a citizen of the United States, and a resident of Baltimore, in the State of Maryland, have invented certain new and useful Improvements in Automatic Metal-Feeding Devices for Torches, of which the following is a specification.

This invention relates to oxy-acetylene welding and other torches and has to deal more particularly with the method of and means for automatically feeding metal particles to the weld or to the surface on which a metal coating is to be deposited.

The general object of the present invention is to provide a simple, novel and efficient means for and method of supplying metal in granular form to the parts to be welded, or to a metal part on which a metal is to be deposited, the feeding means being an attachment or essential part of the torch, or a separate instrument, so that the operator can easily, quickly and efficiently supply metal to the work with a much better amalgamating effect than when a solid rod is used.

The method consists in preferably preheating the metal to be welded or filled, using the torch flame, and when the metal is sufficiently heated, the granulated metal is forcibly fed to the work by a stream of oxygen or other fluid, or by any other suitable agency, with the result that the particles immediately adhere to the heated surface, and under the influence of additional heat from the torch flame there is a quick amalgamation of the particles with the metal being welded or filled. Practice shows that metal added in this manner amalgamates more thoroughly than when the solid rod is used, and furthermore that the metal does not have to be "puddled" in the way necessary with a solid rod to cause amalgamation.

It is preferable, at the time of feeding the metal particles, to cut down the gas flow to the flame to a point sufficient to keep the flame from extinguishing, as otherwise the high pressure of the flame would blow the particles away from the work. As soon as the particles adhere, the flame is restored and played on the work and metal particles to complete the amalgamation.

For a more complete understanding of the invention reference is to be had to the following description and claims taken in connection with the accompanying drawing which illustrates one embodiment of which the invention is capable.

The figure is a side view of a torch equipped with the automatic metal particle feeding device.

Referring to the drawing, 1 designates the flame tip or nozzle of the torch or blow pipe to which acetylene gas and oxygen are supplied through tubes 2 and 3, although other combustible fluids may be employed. The gas and oxygen mix in the tube 4 to which the nozzle 1 is attached. The torch has a handle 5 through which the gas and oxygen conduits extend, and at the rear end of the handle are mixture regulating valves 6 and 7 in the tubes 2 and 3. At the front end of the handle the tubes have trigger valves 8 and 9, each normally held open by a spring 10. The trigger 11 of valve 8 has a cam 12 which engages the trigger 13 of valve 9 so as to close the latter as the operator closes the valve 8, for the purpose of regulating the flame.

Associated with the tip 1 is a metal particle spraying nozzle 14 which is connected with a reservoir of equivalent means 15 that holds metal particles, and into the nozzle leads a pipe 16 which terminates in an ejector nozzle 17. The pipe is connected with the oxygen conduit at a point on the inlet side of the regulating valve 7, so that the full pressure of the oxygen will always be available for the spraying device. In the pipe 16 is a controlling valve 18 provided with a trigger 19 that is under the tension of the valve-closing spring 20 and that is adapted to be engaged by the cam 21 on the trigger 13, so that when the valves 8 and 9 are closed the spraying valve 18 will be open.

If desired, the spraying of metal can take place when the welding flame is operating, this being done by holding the valve 18 open while the valves 8 and 9 are open. But it is preferable to spray the metal particles while the flame is not operating at full force (as shown in the drawing), as otherwise the particles might be blown away to some extent. The flame is cut down by operating the trigger 11 just low enough to prevent extinguishing, and this takes place simultaneously with the opening of the metal feed. In the figure the valves 8 and 9 are closed and the valve 18 opened.

In use, the flame is used to preheat the work, and when the latter is sufficiently heated, the flame is manually reduced and the metal particle feed simultaneously opened. The particles will now adhere to the work, and when a sufficient amount of particles are sprayed the feed is stopped and the flame restored to complete the weld by additional heat. The universal joint 22 permits of adjustment of the metal discharging nozzle whenever required.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An apparatus of the class described, comprising a flame projector and a device at one side thereof for directing a stream of metal particles toward the work which stream converges toward the flame and impinges on the work directly in front of the flame projector.

2. The combination of a blow pipe or torch utilizing gas, with a device associated therewith for feeding metal particles to the work on which the flame is directed, and means for automatically cutting down the gas flow when the device is feeding.

3. A blow pipe or torch comprising a valve controlling the flow of gas, a device for feeding metal particles, a valve for the said device, and means for causing one valve to open while the other closes, or vice versa.

4. In an apparatus of the class described, a flame nozzle, means for supplying gas thereto, a valve controlling the said means, a metal particle discharging nozzle at one side of the flame nozzle for directing a stream of metal particles toward the work which stream converges toward the flame and impinges on the work directly in front of the flame projector, means for supplying a spraying fluid thereto, and a valve for the last mentioned means.

5. A blow pipe or torch comprising a flame nozzle, means for supplying gas thereto, a valve controlling the said means, a metal particle discharging nozzle to one side of the flame nozzle, means for supplying a spraying fluid thereto, a valve for the last-mentioned means, and means for opening one valve while closing the other.

6. An automatic metal feeding blow pipe or torch including a valve controlling the feed of metal particles, spring means normally holding the valve closed, a gas valve, spring means normally holding the gas valve open, and means for opening the first valve by the closing movement of the second.

7. An automatic metal feeding blow pipe or torch including a metal spraying device, a flame tip, a gas supply means connected with the tip, a valve for the said means, an oxygen supply means connected with the tip, a valve for the last means, a connection between the said oxygen supply means and the said spraying device, a valve on the said connection, and means whereby the last-mentioned valve opens while the other valves move closed.

8. An automatic metal feeding blow pipe or torch including a metal spraying device, a flame tip, a gas supply means connected with the tip, a valve for the said means, an oxygen supply means connected with the tip, a valve for the last means, a connection between the said oxygen supply means and the said spraying device, a valve on the said connection, means whereby the last-mentioned valve opens while the other valves move closed, a regulating valve for the gas, and a valve for regulating the oxygen pressure for the tip without affecting the oxygen pressure for the spraying device.

9. The combination with a torch having a flame tip, of an adjustable device at one side thereof for feeding metal particles to that portion of the work upon which the flame impinges.

ALEXANDER FREDERICK JENKINS.

Witnesses:
SAMUEL P. WHITESIDE,
C. B. REDFIELD.